Dec. 11, 1956 N. W. DENSMORE 2,773,584
PIVOT FLIGHT CONVEYOR
Filed Jan. 24, 1955
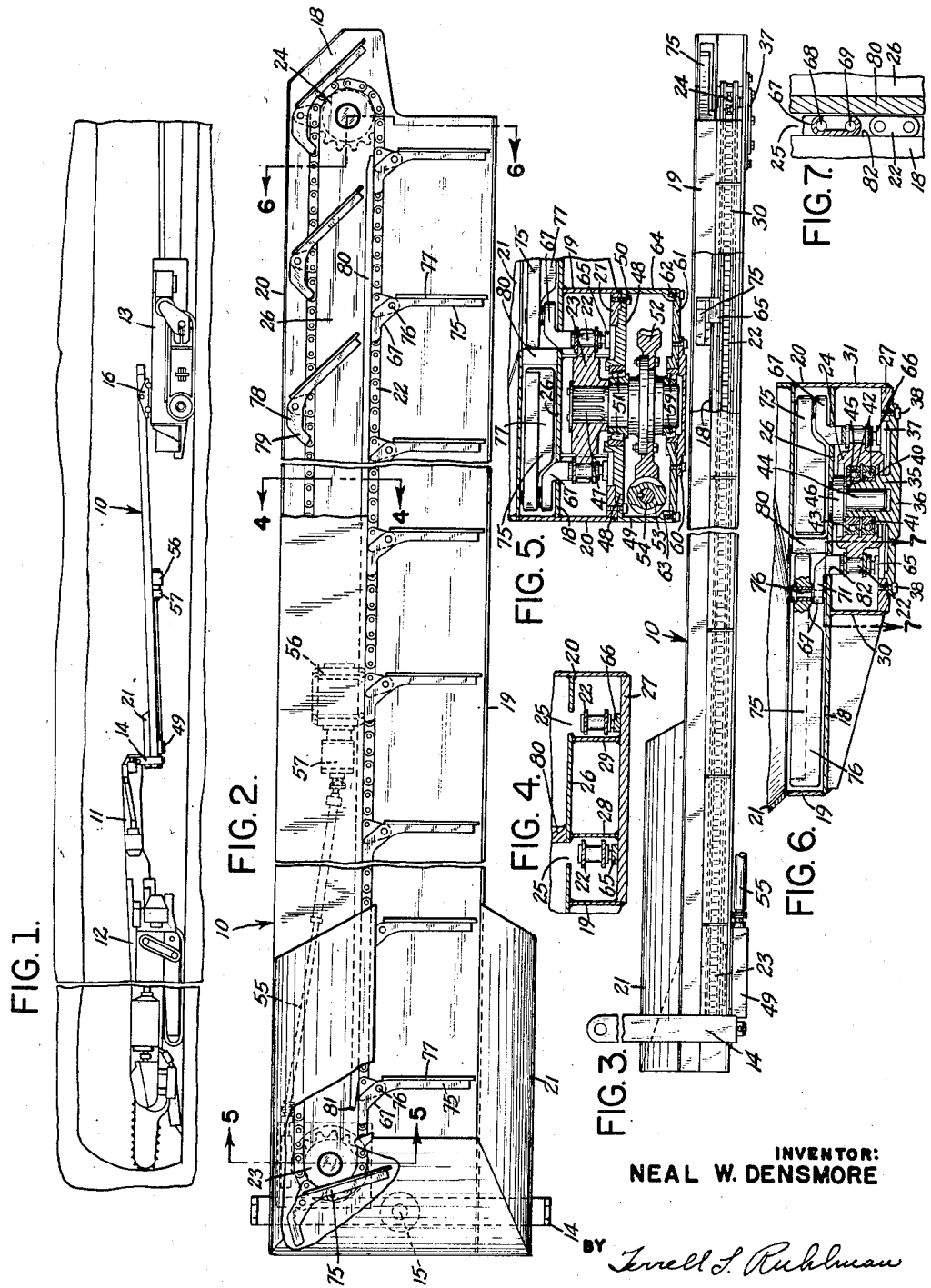
INVENTOR:
NEAL W. DENSMORE
BY *Terrell S. Ruhlman*
ATTORNEY

United States Patent Office 2,773,584
Patented Dec. 11, 1956

2,773,584

PIVOT FLIGHT CONVEYOR

Neal W. Densmore, Franklin, Pa., assignor to Joy Manufacturing Company, Pittsburgh, Pa., a corporation of Pennsylvania Application January 24, 1955, Serial No. 483,653

4 Claims. (Cl. 198—170)

The present invention relates to an endless conveyor and more particularly to a conveyor of the type generally known as "Flight Conveyors."

Conveyors of this type find widespread use in underground mining operations as for example for conveying material from a point adjacent the mining to a point on a conveyor or other means for transporting the mined material from the mine. As the space available for occupation by and maneuvering of such equipment in most mines is rather limited it is not only an object of the present invention to provide a flight conveyor which is durable and rugged in construction and which can easily be moved from place to place and into the desired positions, but also an object is to provide a conveyor in which the overall width is less than twice the length of the flights thereof.

Attempts have previously been made to provide flight conveyors of this general type, however, for the most part they have not proven entirely satisfactory. In many instances the difficulties flow from the fact that the conveyor was designed and constructed in such a manner that the torsional load on the flights was transmitted entirely or in a large measure to the conveyor chain thereby causing the chain to kink, and in some instances causing the flights to bend backward beyond their optimum conveying positions, with the result that the efficiency and life of the chain and the conveyor as a whole was greatly reduced. It is therefore another object of the present invention to provide a flight conveyor in which all of the load on the flights is transmitted to a rigid part of the conveyor thus obviating the above mentioned difficulties.

In a preferred embodiment of the conveyor of my present invention I provide an elongated deck plate with a circulating chain positioned therebeneath. Secured to the chain at spaced intervals are a plurality of angular lugs which extend upwardly through an endless channel provided in the deck plate, with a plurality of flights being pivotally secured one adjacent the upper end of each of the lugs. The flights comprise angularly related parts and are pivotally mounted on the upper end of the lugs for turning on an axis disposed between said angularly disposed parts. One of the angularly related portions of the flights extends rearwardly beyond the pivot point and lies at substantially right angles to the portion of the flight on the other side thereof, with this rearwardly extending portion engageable with a guide rib or partition plate which extends longitudinally substantially the full length of the deck plate of the conveyor. The flights are thus maintained at substantially right angles to the longitudinal axis of the conveyor throughout the load-carrying portion of their movement, with the pressure of the material being moved on the flights being transmitted to the deck plate by reason of the lugs bearing against an edge of the deck plate resulting from the aforementioned channels. The guide bar terminates adjacent the discharge end of the conveyor with the flights inclining rearwardly as soon as the rearward portions of the flights move beyond the end of the guide bar. The flights are maintained at an oblique angle to the longitudinal axis of the conveyor during their return movement with the result that the width of the conveyor on the return side is substantially less than on the load-carrying side with the overall width of the conveyor thus being less than twice the width of the flights.

Other objects and advantages will be apparent from the following more detailed description of a preferred embodiment of my invention when read in conjunction with the accompanying drawings in which:

Fig. 1 is a side elevational view showing a flight conveyor designed and constructed according to my present invention secured between a continuous mining machine and a take-up buggy of an extensible belt conveyor;

Fig. 2 is a top plan view of the flight conveyor of the present invention drawn on a larger scale;

Fig. 3 is a side elevational view of the same;

Fig. 4 is a vertical sectional view taken on the plane of line 4—4 on Fig. 2 with parts broken away;

Fig. 5 is a vertical sectional view taken on the plane of line 5—5 on Fig. 2;

Fig. 6 is a transverse vertical sectional view taken on the planes of line 6—6 on Fig. 2, and Fig. 7 is a horizontal sectional view taken on the plane of line 7—7 on Fig. 6.

Referring now more specifically to the drawings, the flight conveyor of the present invention is designated generally by the reference numeral 10 and is shown in Fig. 1 for purposes of illustration secured between the delivery conveyor 11 of a continuous miner 12 and the take-up buggy 13 of an extensible belt conveyor. The flight conveyor is pivotally secured to the end of the delivery conveyor 11 in any suitable manner and in the illustrated form by means of a U-shaped support 14, upon which it is pivotally supported for turning on an upright axis 15, while the delivery end of the flight conveyor is pivotally secured to a dolly 16 which is longitudinally movable along tracks carried on the upper portion of the take-up buggy 13.

It will be understood of course that the specific application of the flight conveyor as shown in Fig. 1 is merely for illustrative purposes, as it would have many other applications, and accordingly the improvements described and claimed below are not to be limited by such specific application.

The improved flight conveyor proper, according to the present invention, comprises a generally horizontal deck plate 18 having longitudinally extending upstanding side plates 19 and 20 and a receiving hopper 21 built up adjacent one end thereof. An endless chain 22 is positioned beneath the deck plate 18 and is supported by and overruns sprockets 23 and 24 which are in turn supported adjacent the ends of the conveyor in a manner as set forth below. Deck plate 18 is cut away to form an endless channel 25 with the central portion 26 of the deck plate being supported on and in spaced relation to a plate 27, which extends longitudinally beneath deck plate 18, by means of longitudinally extending ribs 28 and 29 secured therebetween (Fig. 4). The plate 27 is in turn secured between the lower edges of the depending side member 30 and an extended portion 31 of the side plate 20.

Sprocket 24 is supported, as shown best in Fig. 6, on an upstanding annular portion 35 of a cover plate 36 which is secured to the lower plate 27 adjacent an annular cutout portion 37 therein by means of screws or the like 38. Upstanding portion 35 is provided with a shoulder 40 and an annular sleeve 41 is secured to said portion and supported upon said shoulder, the sleeve forming a race for the ball bearings 42 which are positioned between said race and an annular sleeve 43 which is secured to the sprocket 24. To provide a more rigid mounting for the sprocket there is provided a pin 44 which is secured beneath the central portion 26 of the deck plate and which extends downwardly into the hollowed center of portion 35. The upper edge 45 of said portion abuts a shoulder 46 provided by an enlarged upper end of pin 44, with the result that a rigid support is provided about which sprocket 24 is freely rotatable.

Sprocket 23, on the other hand, is keyed to a shaft 47 which extends through and is journaled by means of suitable bearings 51 in the cover plate 48 of a gear box 49 which is secured to the underside of plate 27 by means of screws or the like 50. Drive is imparted through the shaft 47 to the chain 22 by means of a worm gear 52, secured to the portion of shaft 47 within gear box 49, meshing with a worm 53 keyed to a shaft 54 which is in turn secured by means of a suitable universal coupling to a shaft 55 which is driven by a motor 56 through a gear reduction unit 57 both of which latter units are suitably mounted on the underside of plate 27 intermediate the ends thereof. The lower end of shaft 47 is suitably journaled by means of bearings 59 in a cover plate 60 which is secured to the removable bottom plate 61 of gear box 49 which plate is in turn secured by means of screws or the like 62 to the lower ends of depending side plates 63 and 64 of the gear box.

Although the chain 22 in the illustrated embodiment is driven at one end of the conveyor, it will be apparent that it can be driven from a point intermediate the ends thereof by minor changes in construction within the skill of one familiar with the art. Chain 22, as aforementioned, is positioned beneath the endless channel 25 formed in the deck plate 18 with a pair of longitudinally extending wear strips 65 and 66 being secured to the upper surface of plate 27 and positioned beneath chain 22 along the delivery and return side thereof to prevent any substantial flapping of the chain. It can be seen also that with the chains supported on the strips 65 and 66 the flights can be maintained in an elevated position with their lower edges substantially free of frictional engagement with the upper surface of the deck plate 18. A plurality of angular lugs 67 are secured in spaced relation to chain 22 by means of elongated pins 68 and 69 which also extend through the links and straps of the chain to hold the same together. The lugs extend upwardly through channel 25 and terminate in a horizontal portion 71 which extends outwardly toward the sides of the conveyor above deck plate 18. A plurality of horizontally disposed flights 75 are secured one to each of the lugs 67 on the upper portions 71 thereof by means of vertically disposed pins 76 about which they are freely swingable. The flights forward of their pivotal axes are provided with vertically extending portions 77 which lie substantially at right angles to the flights proper to provide a surface for engaging the material to be moved. Rearwardly of their pivot points the flights are angularly shaped with an intermediate portion 78 thereof lying about 45° from the plane of the longer arm of the flights and a terminating shorter arm portion 79 which lies at an angle of about 45° with respect to portion 78 and substantially at right angles to the longer arm of the flights.

An elongated rib or guiding bar 80 extends longitudinally substantially the full length of the deck plate 18 and is positioned adjacent channel 25 on the delivery or load-carrying side of the conveyor. Rib 80 terminates at the material receiving end of the conveyor in a bevel 81 and it can be seen from Fig. 2, that as the flights 75 move about the sprocket 23 and into engagement with the material which is discharged into the hopper 21 and onto the deck plate, they will be swung in a clockwise direction about their pivotal axes 76 to a substantially perpendicular position with respect to chain 22, with the outer surface of the shorter arm 79 thereof engaging the guiding rib 80 to thereby prevent their being swung beyond their aforementioned substantially perpendicular position. The engagement of arm 79 with rib 80 holds the flights in this position throughout their movement along the delivery side of the conveyor and until they move beyond the end of the rib adjacent the discharge end of the conveyor. As the flights begin their movement about the sprocket 24 they are swung in a clockwise direction as viewed in Fig. 2, and as they continue their movement along the return side of the conveyor they remain in this rearwardly inclined position with the intermediate portion 78 of the flights engageable with the side frame member 20 to maintain them in this position.

It will be apparent therefore that, as the flights 75 move along the load-carrying side of the conveyor, the pressure exerted thereon by the material being moved along the deck plate will tend to pivot the flights rearwardly, or in a clockwise direction as viewed in Fig. 2, about their pivotal axes 76. However, due to the camming engagement of the shorter arm 79 of the flights with the guide rib 80, the flights are held against pivotal movement about the axes 76 with the result that they tend to rotate about the outer edge of the free end of the shorter arm 79 which at the same time tends to impart a linear movement to the flights 75 toward the side plates 19 of the conveyor. Ordinarily this would tend to kink or twist the chain 22 out of line, however due to applicant's novel mounting arrangement for the flights wherein they are pivotally secured to the lugs 67 which extend through the channels 25 in the deck plate, the torsional or linear force on the flights is transmitted through the lugs to the edge 82 of the deck plate forming a wall of the channel on the load-carrying side of the conveyor, rather than being transmitted to the chain. In other words, the pressure of the material being moved on the long arms of the conveyor flights tending to cause a lever action about the fulcrum formed by the contact between the short arms 79 of the conveyor flights and the rib 80 is prevented from imparting any harmful forces to the chain because the lugs are constrained by their engagement with the outer wall 82 of the channel formed in the deck plate. It is apparent therefore that due to the forces resulting from pressures on the flights being transmitted to a rigid part of the conveyor, the difficulties arising from chain distortion are obviated.

From the foregoing it can be seen that by the present invention I have provided a flight conveyor whose overall size is substantially reduced from the conventional type flight conveyor but one which is rugged and durable. Also due to the novel mounting between the flights and the endless drive chain, the present conveyor is made more durable with the life of the chain and the conveyor as a whole greatly lengthened.

It should be understood however, that while there is in the present application specifically described one embodiment which the invention may assume in practice, this is disclosed for purposes of illustration and that the invention may be modified and embodied and practiced in various other forms and ways without departing from its spirit or the scope of the appended claims.

What I claim is:

1. In a conveyor, in combination, an elongated deck plate having an endless channel formed therein, a circulating chain beneath said plate and lying in a generally horizontal plane, a plurality of flights lying adjacent the upper surface of said deck plate, a plurality of lugs secured to said chain and extending upwardly through said channel, said flights being pivotally secured one to each of said lugs for pivotal movement in a generally horizontal plane, and means to limit the pivotal movement of said flights in one direction throughout a portion of their orbital movement with the torsional load on said flights through said portions of their movement being transmitted through said lugs to said deck plate.

2. A conveyor as set forth in claim 1 in which said lugs are angular and said flights are pivotally secured adjacent the free ends of said lugs.

3. A conveyor as set forth in claim 1 in which said last means includes a cam extending longitudinally of the conveyor engageable by said flights during the load-carrying portion of their movement.

4. A conveyor as set forth in claim 3 in which said flights have a portion extending rearwardly with respect to the orbital movement of said flights said extended portions being engageable with said cam as the flights move through the load-carrying portion of their orbital paths.

References Cited in the file of this patent

UNITED STATES PATENTS

| 367,102 | Hospes et al. | July 26, 1887 |

FOREIGN PATENTS

| 672,956 | Germany | Mar. 17, 1939 |
| 688,828 | Great Britain | Mar. 18, 1953 |